Dec. 22, 1959  J. M. COLE ET AL  2,918,307
ADJUSTABLE FENDERS AND STEP PLATES FOR TRACTOR
Filed Oct. 23, 1956
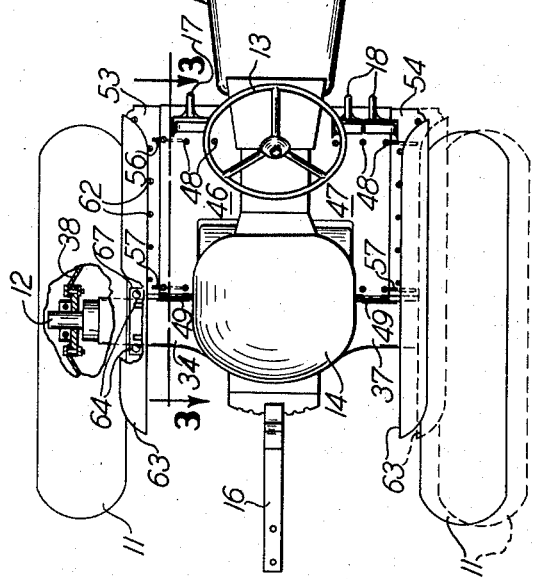
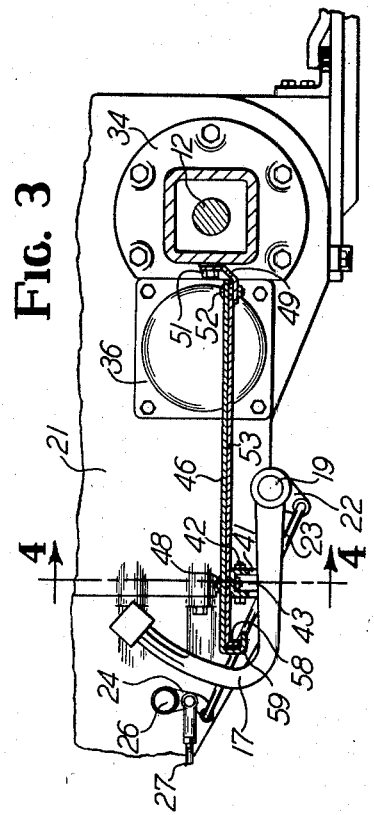
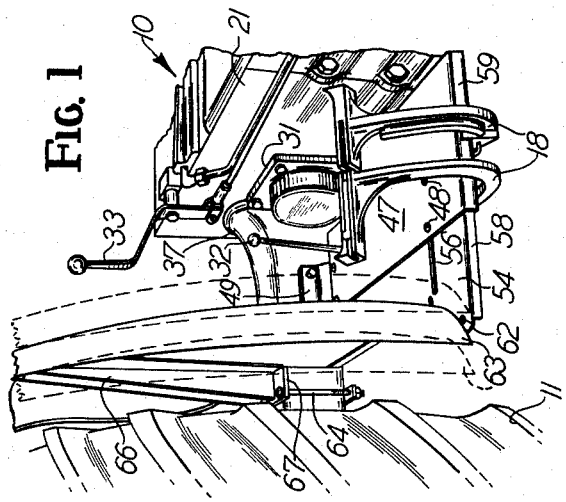
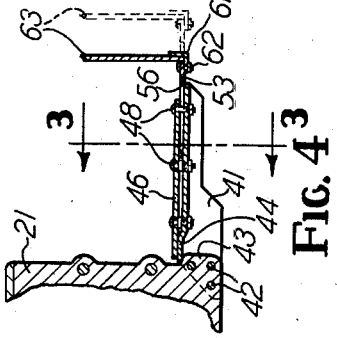
INVENTORS:
JOHN M. COLE
FRANK B. HENRY
BY: Emerson B. Donnell
ATTORNEY.

2,918,307

ADJUSTABLE FENDERS AND STEP PLATES FOR TRACTOR

John M. Cole, Davenport, Iowa, and Frank B. Henry, Rock Island, Ill., assignors to J. I. Case Company, Racine, Wis., a corporation of Wisconsin Application October 23, 1956, Serial No. 617,851

3 Claims. (Cl. 280—152)

This invention relates to tractors, and it particularly relates to an adjustable step plate and fender for tractors.

The main object of this invention is to provide an adjustable step plate and fender for tractors of the type wherein the rear wheels are adjustable along the tractor rear axle to desired spacings between the two rear wheels.

A more specific object of this invention is to provide on a tractor, wherein the rear wheels are adjustable along the rear axle, adjustable fenders which can be positioned adjacent the rear wheels in all adjusted positions of the latter and thereby shield the tractor from the dirt thrown by the wheels.

Another object of this invention is to provide a tractor having adjustable rear wheels with adjustable step plates or platforms which can be positioned laterally outwardly on the tractor when the rear wheels are similarly positioned, thereby increasing the clearance for the operator's foot and making it easier to mount and dismount the tractor.

Other objects and advantages will become apparent upon reading the following description in conjunction with the accompanying drawings, wherein:

Fig. 1 is a front perspective view of a fragment of a tractor showing a preferred embodiment of this invention, the dotted lines showing the tractor fender in two different adjusted positions.

Fig. 2 is a reduced top plan view of the tractor shown in Fig. 1 but showing only the rear end of the tractor and with parts broken away, the right rear wheel and the fender and step plate being shown in an adjusted position by the dotted lines.

Fig. 3 is an enlarged sectional view taken along the line 3—3 of Fig. 2; which is also along the line 3—3 of Fig. 4.

Fig. 4 is a sectional view taken along the line 4—4 of Fig. 3 but with a fragment of the fender added and showing in dotted lines the step plate and a fragment of the fender in an adjusted position.

The same reference numerals refer to the same parts throughout the several views.

The drawings show a tractor body 10 which is supported on the ground by the usual tractor rear wheels 11 mounted on the rear axle 12. Also, the usual tractor steering wheel 13, seat 14, and rearwardly extending drawbar 16 are attached to and included as a part of the tractor, all in a well-known manner. In addition, the usual clutch pedal 17 and two brake pedals 18 are suitably mounted on opposite sides of the tractor for their well-known purposes. The clutch pedal 17 is shown mounted on the shaft 19 attached to the transmission housing 21. A plate 22 is attached to the clutch pedal arm and a link 23 extends to the rocker arm 24. The latter is mounted on a shaft 26, and an adjustable link 27 is attached to the arm 24 for transmitting motion of the arm 24 to the clutch (not shown).

Fig. 1 shows the right hand side of the tractor with the brake pedals 18 and the right hand brake housing 31 shown attached to the side of the transmission housing 21. Also shown are the brake lock lever 32, which is a parking brake, and the usual tractor hitch control lever 33 for hydraulically controlling the rearwardly extending tractor hitch or lift arms (not shown). Fig. 3 shows the left hand axle housing 34 bolted to the side of the transmission housing 21, and, of course, the housing encloses the axle 12. The left hand brake housing 36 is also shown bolted to the side of the transmission housing 21. Fig. 1 shows the right hand axle housing 37 secured to the transmission housing 21 in the manner in which the left hand axle housing is secured. With regard to the axle housings 34 and 37, it will be noticed in Fig. 2 that the lateral ends of the housings are square in cross-section, and this is significant for a reason mentioned later.

Fig. 2 shows that the left hand wheel 11 includes the wheel rim 38 which angles inwardly toward the fore-and-aft axis of the tractor. The wheel can, of course, be removed from the axle 12 and reversed to have the rim angle outwardly and this would cause the wheel to be disposed in an outwardly adjusted position further away from the tractor body 10. The right hand wheel 11 in Fig. 2 shows the two positions of the wheel with the dotted lines showing the laterally outward position. Of course there are other ways and means of adjusting the rear wheel positions on the axle 12 but it is sufficient here to mention only this one manner of adjusting.

The foregoing describes a conventional tractor and no further description thereof is deemed to be necessary for a complete disclosure of this invention as specified hereinafter.

When the rear wheels are adjusted laterally outwardly of the tractor, the wheels are not properly shielded by the fenders nor are the tractor parts protected from the then more fully exposed wheels. This invention copes with those problems by providing a novel fender and platform or step plate mounting on the tractor.

Figs. 3 and 4 show a bracket or support 41 secured by bolts 42 to a boss 43 on the side of the transmission housing 21. The support 41 extends horizontally and laterally of the tractor and it should be understood that there is an identical support on the right hand side of the housing 21. It should be noted that the inwardly disposed end 44 of the support 41 is shown to be offset upwardly. Fixed platforms or step plates 46 and 47 are respectively disposed above the supports 41 and are secured thereto along the front ends of the platforms by fasteners or bolts 48. The rear edges of the platforms 46 and 47 are each respectively secured to the axle housings 34 and 37 by a support 49 which is bolted to the axle housings by bolts 51 and to the plates 46 and 47 by fasteners or bolts 52. In this manner, the plates 46 and 47 are rigidly attached to the tractor, and form a rigid or first portion of the tractor platform on which the operator can stand. It will be noticed in Fig. 4 that the inwardly disposed end of the platform 46 rests on the end 44 of the support 41, and, since the members 41 and 46 are horizontal, they are spaced apart through the remainder of their lengths.

Step plates 53 and 54 are respectively disposed below the plates 46 and 47, and the plates 53 and 54 are adjustable laterally of the tractor by means hereinafter described. The plates 53 and 54 are each provided with parallel slots 56 and 57 which are spaced apart a distance equal to the spacing and disposition of the bolts 48 and 52. Thus, the laterally outwardly disposed one of each row of the bolts 48 and 52 passes through the slots 56 and 57 to slidably secure the plates 53 and 54 to the plates 46 and 47. In this manner, loosening of one of each row of the bolts 48 and 52 will permit the plates 53 and 54 to be slid laterally of the tractor and with respect to the plates 46 and 47 to thereby increase and decrease the width of the operator's platform. If the plates are slid outwardly, then tightening of the bolts 48 and 52 will secure the plates in the outward position and this position is, of course, desired when the wheels 11 have been moved outwardly. The rear edges of the plates 53 and 54 are directly supported on the supports 49 while the front edge or bend 58 of the plate 53 is shown in Fig. 3 to be angled and nested in the angles or channeled end or return bend 59 of the plate 46. The latter arrangement constitutes mating means between the plates and makes the sliding support of the plates 53 and 54 a firm support and prevents the plates 53 and 54 from tipping downwardly.

The laterally outward edges of the plates 53 and 54 have an angle iron 61 secured thereto by bolts 62, as seen in Fig. 4. A fender 63 is attached to each angle iron 61 and extends thereabove to shield the tractor from the wheels 11, as shown in Fig. 1. Thus the step plates or platforms 53 and 54 are rigidly attached to the two fenders 63 so that the latter moves with the plates 53 and 54 when the plates are adjusted. There then is a combined fender and step plate unit which is on each side of the tractor and is adjustable laterally of the tractor. In this regard, it should be noticed that the units and the clutch and brake pedals are disposed so that the pedals are always shielded from the wheels 11 regardless of the lateral position of the wheels. Further, with this arrangement, the fenders 63 can extend all the way to the platform at the front of the fenders.

The fenders 63 have additional means for supporting them on the tractor, and Figs. 1 and 2 show the fenders attached to the square ends of the axle housings 34 and 37 by means of bolts 64. Fender ribs or braces 66 are attached to the laterally outward sides of the fenders 63 and terminate in horizontal portions 67 through which the bolts 64 pass to clamp onto the axle housing. Since the axle housings are of a square cross-sectional shape, they present horizontal top and bottom surfaces which properly position the fenders 63 and retain the fenders in that proper position. Of course, when it is desired to adjust the positions of the fenders, the bolts 64 are loosened to permit the fenders to slide along the axle housings.

Fig. 1 shows in dotted lines two positions of the fender 63. Fig. 2 shows two positions of the right hand wheel and fender, and the broken-away portions on the left hand wheel and fender show their mountings and the range of adjustments.

While a specific embodiment of this invention has been shown and described, it should be understood that certain changes could be made without deviating from the scope of this invention which should, therefore, be limited only by the appended claims.

What is claimed is:

1. In a tractor including a pair of rear wheels mounted on the tractor rear axle for movement therealong laterally of said tractor, the combination of a horizontally and fixedly disposed first platform attached to said tractor on the side thereof and terminating in a laterally outwardly disposed edge spaced from the one of said wheels on said side of said tractor, a support bracket on said tractor beneath said first platform and spaced therebelow at the laterally outward end of said first platform, a second platform attached to the undersurface of said first platform in the space between said first platform and said support bracket and forming a horizontal extension to said first platform and being laterally movable with respect to the latter within the space between said edge and said one of said wheels, a fender attached to the laterally outwardly extending edge of said second platform for movement with the latter, means on said second platform and said fender for securing the latter two in a selected lateral position on said tractor, and mating means on said platforms for vertically suspending said second platform below said first platform.

2. In a tractor including a pair of rear wheels mounted on the tractor rear axle for movement therealong laterally of said tractor, the combination of support means and a platform attached to each opposite side of said tractor and extending laterally thereof with a space therebetween in the laterally outer extent thereof, a step plate mounted on each of said support means in said space and slidable laterally of said tractor, means attached between said support means and said platform for securing said step plate in a selected position laterally of said tractor, and a fender attached to said step plate and movable there with for positioning said fender adjacent the position of one of said rear wheels when the latter is positioned along said tractor rear axle.

3. In a tractor including a pair of rear wheels mounted on the tractor rear axle for movement therealong laterally of said tractor to alter the spacing between said read wheels, the combination of support means attached to the side of said tractor at the level of said rear axle and forward thereof, a releasable fastener attached to said support means and vertically disposed thereon, a first step plate secured on said support means and including an underturned channel at the forwardly disposed edge thereof, a second step plate horizontally mounted on said support means below said first step plate and having a slot therein disposed laterally of said tractor and with said fastener projecting through said slot for releasably securing said second step plate to said support means and said second step plate including an underturned angle for telescopically nesting in said channel so that said second step plate is slidable laterally of said tractor on said support means when said fastener is released, and a fender attached to the laterally outwardly disposed end of said step plate for slidable movement with the latter and projecting thereabove in the projected area of the one of said rear wheels on said one side of said tractor.

References Cited in the file of this patent
UNITED STATES PATENTS

| | | |
|---|---|---|
| 979,074 | Kelly | Dec. 20, 1910 |
| 1,341,355 | Browne | May 25, 1920 |
| 2,545,139 | Elfes | May 13, 1951 |

FOREIGN PATENTS

| | | |
|---|---|---|
| 656,901 | Great Britain | Sept. 5, 1951 |